United States Patent [19]

Fletcher et al.

[11] 3,916,380

[45] Oct. 28, 1975

[54] MULTI-COMPUTER MULTIPLE DATA PATH HARDWARE EXCHANGE SYSTEM

[76] Inventors: James C. Fletcher, Administrator of the National Aeronautics and Space Administration, with respect to an invention of Tage O. Anderson, Arcadia, Calif.

[22] Filed: Nov. 6, 1974

[21] Appl. No.: 521,601

[52] U.S. Cl. .......................... 340/147 R; 340/147 C

[51] Int. Cl.[2] .......................................... H04Q 11/00

[58] Field of Search .......... 340/147 R, 147 LP, 152, 340/163, 147 CN, 147 C, 172.5

[56] References Cited

UNITED STATES PATENTS 3,366,849 1/1968 De Raedt ...................... 340/147 LP

*Primary Examiner*—Harold J. Pitts

*Attorney, Agent, or Firm*—Monte F. Mott; John R. Manning; Paul F. McCaul

[57] ABSTRACT

A switch controller in a multi-computer processing system functions to establish a data path between any two computers in the system and maintain that data path, without interference, while establishing other independent unidirectional data paths with other pairs of computers. All computers in the system are continuously and rapidly scanned for a request-to-send signal. Those computers that are already engaged in data transmission are leap-frogged by the scanning mechanism. When a request-to-send signal is detected by a particular scanning mechanism, that scanning mechanism stops at the computer generating the request, to provide for an interconnection between the requesting sender and the intended receiver. If during this interconnection phase, it is determined that the intended receiver is occupied, the interconnection is prevented from being completed and the scanning mechanism is instructed to resume scanning of the computers for another request-to-send signal.

30 Claims, 13 Drawing Figures

MULTI-COMPUTER MULTIPLE DATA PATH HARDWARE EXCHANGE SYSTEM

BACKGROUND OF THE INVENTION

ORIGIN OF THE INVENTION

The invention described herein was made in the performance of work under NASA contract and is subject to the provisions of Section 305 of the National Aeronautics and Space Act of 1958, Public Law 85-568 (72 STAT. 435; 43 U.S.C. 2457).

FIELD OF THE INVENTION

The present invention relates generally to improvements in switching exchanges for multi-computer processor systems, and more particularly pertains to new and improved multiple data path switching exchanges for multi-computer processor systems.

DESCRIPTION OF THE PRIOR ART

Prior art consideration of the problem of simultaneously interconnecting a plurality of computer pairs, instead of just a single pair, has resulted in a variety of different solutions. One solution presented provides for a physical link between each pair of computers which had a need to communicate. This interconnection scheme would entail N (N−1)/2 links for N computers. This solution is expensive in hardware, but provides for maximum flexibility. In this arrangement messages directed from one computer to another are routed by addressing the physical link interface hardware attached to the source computer.

Another prior art solution to the same problem involves removing some of the N (N−1)/2 links, leaving only those links that connect each computer to only a small number of its neighbors. By providing message routing information within the message unit utilized in this type of system, functional data paths exist between computers which are not physically directly connected. This type of arrangement is sometimes called a single channel ring communication system. An example of a variation of this ring system is the IBM Technical Disclosure Bulletin Volume 15, No. 1, published June, 1972.

Yet another prior art solution to the above problem is to utilize what is sometimes called a star interconnection configuration. This type of configuration entails the use of a switching mechanism centrally located between the intercommunicating computers with each of the computers linked to this switching unit by respective data paths. FIG. 1 represents a typical star configuration in abstract form. A plurality of computers, 0–15, situated around a perifery 11 are connected to a central switching mechanism 13 by their respective data paths, such as data path 12, for example. The switching mechanism 13 consists, basically, of a scanning mechanism 15 that rapidly scans, in a single direction, all the inbound data paths of the various computers 0–15. Responsive to destination address information received from one of these computers by way of scanning mechanism 15, a distribution mechanism 17 is directed to move to the outbound data line of the intended receiving computer or device. As illustrated in FIG. 1, distribution mechanism 17 instantaneously connects to an input port upon command, while scanning mechanism 15 moves in a clockwise direction.

OBJECTS AND SUMMARY OF THE INVENTION

It is an object of this invention to provide an exchange system for interconnecting computer pairs in a multi-computer system, in order to establish multiple, simultaneous, independent and unidirectional data paths therebetween.

Another object of this invention is to provide for scanning, by a plurality of scanning devices, of computers in a multi-computer system for a request-to-send signal, without interferring with each other.

A further object of this invention is to provide scanning mechanisms for scanning a plurality of computers for request-to-send signals that will leap-frog over quiescent scanning mechanisms that have established or that are in the process of establishing a data path between a pair of computers.

Yet another object of this invention is to provide a mechanism for detecting when an intended data receiving computer is occupied, and in such case instructing the scanning mechanism connected to the requesting sender to resume scanning.

Still a further object of this invention is to provide a sequencing mechanism, for driving a scanning mechanism, which sequencing mechanism generates an address sequence that is dictated by the particular leap-frog constant chosen.

These objects and the general purpose of this invention are accomplished by providing a sequencer and data path switching logic for each independent, unidirectional data path between a plurality of computers in a multi-computer system. Each sequencer steps its respective data path switching logic to scan the computers in a multi-computer system for a request-to-send signal. During the scanning cycle, the switching logic for each unoccupied data path is stepped along sequentially until a busy computer, as evidenced by quiescent switching logic located there, is reached. At this time the scanning switching logic leaps over the quiescent switching logic and continues its scanning sequence. Upon detecting a request-to-send signal eminating from one of the computers being scanned by its switching logic, the sequencer instructs its switching logic to stop scanning (become quiescent). A destination address triggered by a requesting sender directs the switching logic to connect to a certain receiving computer. If the intended receiving computer is found to be busy, the data path cannot be completed.

The sequencer used for each independent data path utilizes a register and full adder connected in a loop. The adder combines the output of the register with a dynamically selected leap-frog constant which sum is then supplied to the register. The leap-frog constant for a particular sequencer, at a particular time, is chosen by comparing the next inbound address of the particular scanning sequencer with the present inbound addresses of all the quiescent sequencers.

The outbound address received from the requesting computer identifies the intended receiving device. This outbound address is compared with inbound addresses and outbound addresses that identify existing data path connections. If a match occurs in any such comparison, the sequencer connected to the requesting computer is directed to resume scanning and the received outbound address is abandoned.

BRIEF DESCRIPTION OF THE DRAWINGS

Other objects and many of the attendant advantages of this invention will be readily appreciated as the same becomes better understood by reference to the following detailed description when considered in conjunction with the accompanying drawings in which like reference numerals designate like parts throughout the figures thereof and wherein.

DESCRIPTION OF THE PREFERRED EMBODIMENTS

Figure 1:
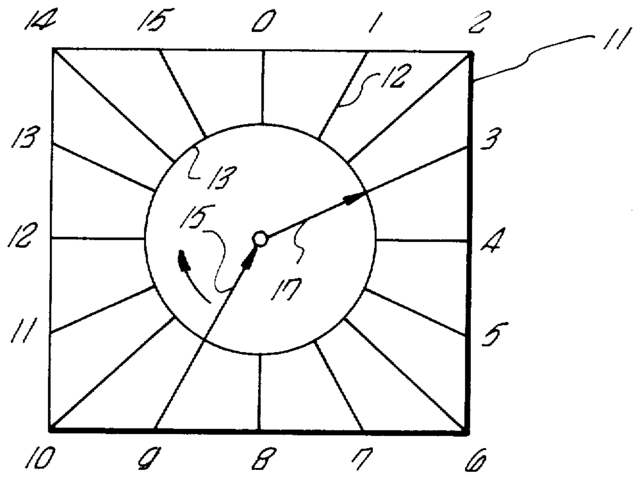
PRIOR ART FIG. 1
FIG. 1 is an abstract illustration of a hardware exchange system envisioned by the prior art.
Figure 2:
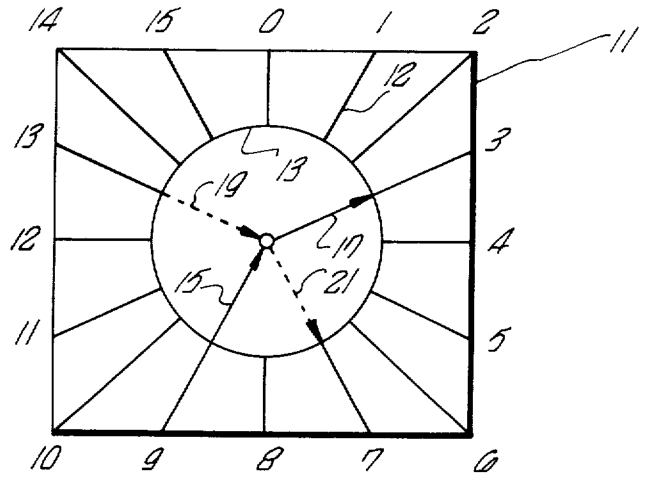
FIG. 2 is an abstract illustration of a two simultaneous data path exchange system contemplated by the present invention.
Figure 3:
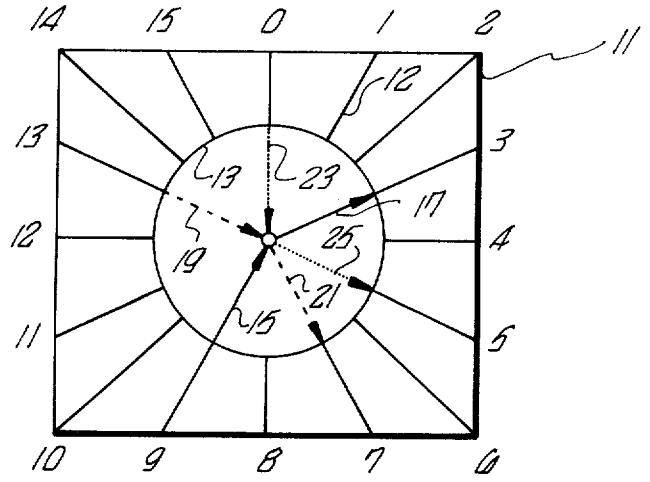
FIG. 3 is an abstract illustration of a three simultaneous data path exchange system contemplated by the present invention.

Referring first to FIGS. 2 and 3, which abstractly illustrate the function of the multiple independent data path exchange of the present invention, a plurality of computers 0–15 are seen as located at a perifery 11 and connected to a centrally located switch controller 13 by way of data paths 12. FIG. 2 shows a two path hardware exchange system wherein the scanning mechanism 15 functions in conjunction with a distributing mechanism 17 to establish a first data path that is independent from a second data path consisting of a scanning mechanism 19 functioning in conjunction with a distributing mechanism 21. FIG. 3 illustrates a three independent data path exchange system wherein an additional scanning mechanism 23 is functioning in conjunction with an additional distributing mechanism 25. The scanning mechanisms 15, 19 and 23 scans the inbound ports of the computers 0–15, in a single direction, until a request-to-send signal is received. At such time, the scanning mechanism sensing that request-to-send signal stops scanning and receives from that particular computer mechanism a code that identifies the intended receiving device. This code is utilized to direct the respective distributing mechanism to the port of that intended receiving device. During the time that this is occurring, in other words, that a data path is being established, other scanning mechanisms are momentarily halted. The scanning process by these other mechanisms will then not interfere with the data path being established. Exactly how active scanning mechanisms leap-frog quiescent scanning mechanisms will be explained hereinafter.

The basic hardware and Multiple Simultaneous Data Path Exchange System and functions of the switch controller 39, that is the heart of the multiple path exchange system of this invention, and its interconnection with the plurality of computer or device ports 27–37 located on a perifery around the switch controller 39, will first be explained in connection with FIG. 4. Each of the boxes labeled port, such as "Port 0" box 27, for example, represents a computer or device capable of generating request-to-send signals and having the ability to transmit data. Thus, 0 port 27, 1 port 29, 2 port 31, 3 port 33, 4 port 35 and N port 37 all located on perifery 11 around the switch controller 39, illustrate devices that can communicate with each other through the switch controller 39. It should be remembered that the ports on the left hand side of the figure are the same ports as those on the right hand side of the figure.

The lines are half-duplex lines, i.e. bidirectional, however active in only one direction at a time. Thus, line 79 from 0 port 27, on the left, to the switch controller 39 is an inbound data line and line 85 from 0 port 27, on the right, to switch controller 39 is an outbound data line.

The switch controller 39 basically comprises an electronic crossbar switch implemented by a plurality of data path multiplexer and demultiplexer pairs. The number of such pairs equal the number of independent data paths. Thus, number 1 data path multiplexer 43 and number 1 data path demultiplexer 45 make up a first data path. Number 2 data path multiplexer 47 and number 2 data path demultiplexer 49 make up a second independent data path. Number N data path multiplexer 51 and number N data path demultiplexer 53 represents any number of further independent data paths, as desired.

The number of data path multiplexer-demultiplexer pairs in the switch controller 39 will determine the number of independent inbound and outbound data paths interconnecting an equal number of sets of two computers through the switch controller. For example, 0 port 27 has three inbound data paths 79, 81 and 83, and three outbound data paths 85, 87 and 89 going to the switch controller 39. All the other port devices are likewise interconnected. That is, for each device, each one of the inbound data paths go to its respective data path multiplexer in the switch controller and each one of the outbound data paths come from its respective demultiplexer in the switch controller 39.

The multiplexer and demultiplexer pairs which comprise the hardware data paths through the switch controller 39 are directed by control logic 41 which generate addresses or switching instructions for the multiplexers and demultiplexers. Number 1 data path multiplexer 43 receives sequential switching addresses from control logic 41 over cable 61. Number 2 data path multiplexer 47 receives switching addresses over cable 63. Number N data path multiplexer 51 receives switching addresses from control logic 41 over cable 65. These multiplexers are the scanning mechanisms represented by the inward pointing arrows of FIGS. 2 and 3. Number 1 demultiplexer 45 receives addresses over cable 67 from control logic 41. Number 2 demultiplexer 49 receives switching addresses over cable 69 and Number N demultiplexer 53 receives switching addresses from control logic 41 over cable 71. These demultiplexers are the distributing mechanisms represented by the outward pointing arrows in FIGS. 2 and 3.

Each multiplexer-demultiplexer pair is connected together to form a single data path. Multiplexer-demultiplexer pair 43–45 is connected together by data path 55. Multiplexer demultiplexer pair 47–49 is connected together by data path 57 and multiplexer-demultiplexer pair 51–53 is connected together by data path 59. Each of these data paths 55, 57 and 59 are the source of control information, supplied over lines 73, 75 and 77 to the control logic 41. The control logic 41, as will be hereinafter explained, utilizes this information to generate appropriate switching addresses for the multiplexers and demultiplexers of the switch controller 39.

Figure 5:
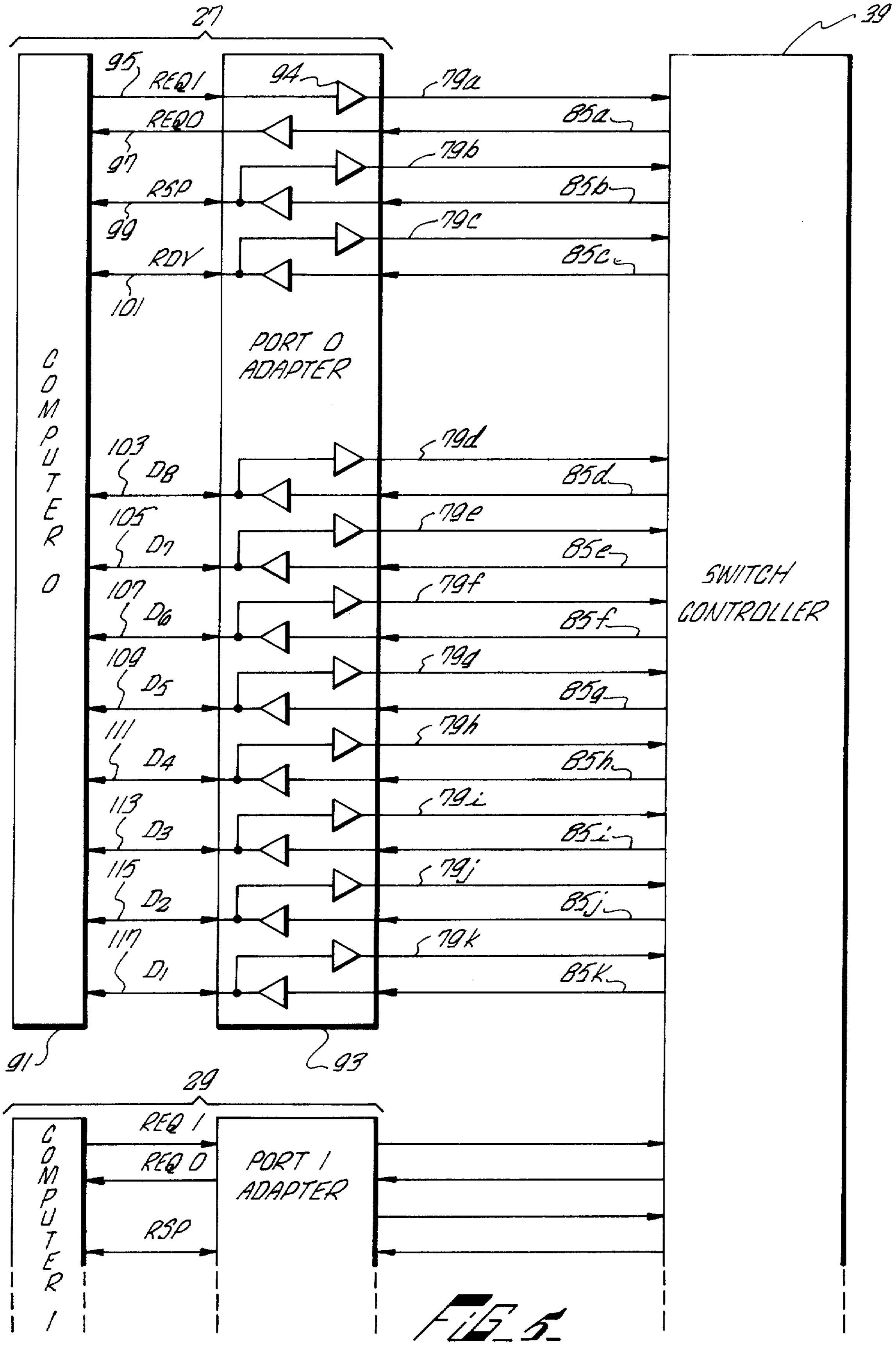
FIG. 5 is a logic and block diagram illustration of the data lines in a data path that interconnect a single computer port with the exchange switch controller of the present invention.

In order to more readily comprehend the interconnection of cables between the switch controller 39 and the various computers, reference should be made to FIG. 5 which illustrates a typical multi-conductor interface cable used to provide an inbound and outbound data path between a single computer device and the switch controller 39. In the example, a computer device 91 interfaces with a port adaptor 93 by way of a plurality of half duplex lines. There are eight data lines 103 to 117 and four control signal lines 95 through 101. These half duplex lines are converted to unidirectional signal paths by port adaptor 93 which shows a plurality of unidirectional line drivers 94 that are well known in the art and will not be discussed herein.

Thus, inbound request line 95 leaves the port adapter 93 as inbound conductor **79*a*. Outbound request line 97 leaves the port adapter as outbound conductor 85*a*. Half-duplex response line 99 leaves the port adapter as inbound conductor 79*b* and outbound conductor 85*b*. Half-duplex response line 101 leaves the port adapter as inbound conductor 79*c* and outbound conductor 85*c*, and so on. As can be seen from FIG. 5, all the conductors numbered 79*a* through 79*k*represent the conductors of the inbound data path cable 79 (FIG. 4), and the conductors numbered 85*a* through 85*k* represent the conductors of the outbound data path cable 85** (FIG. 4).

Figure 6:
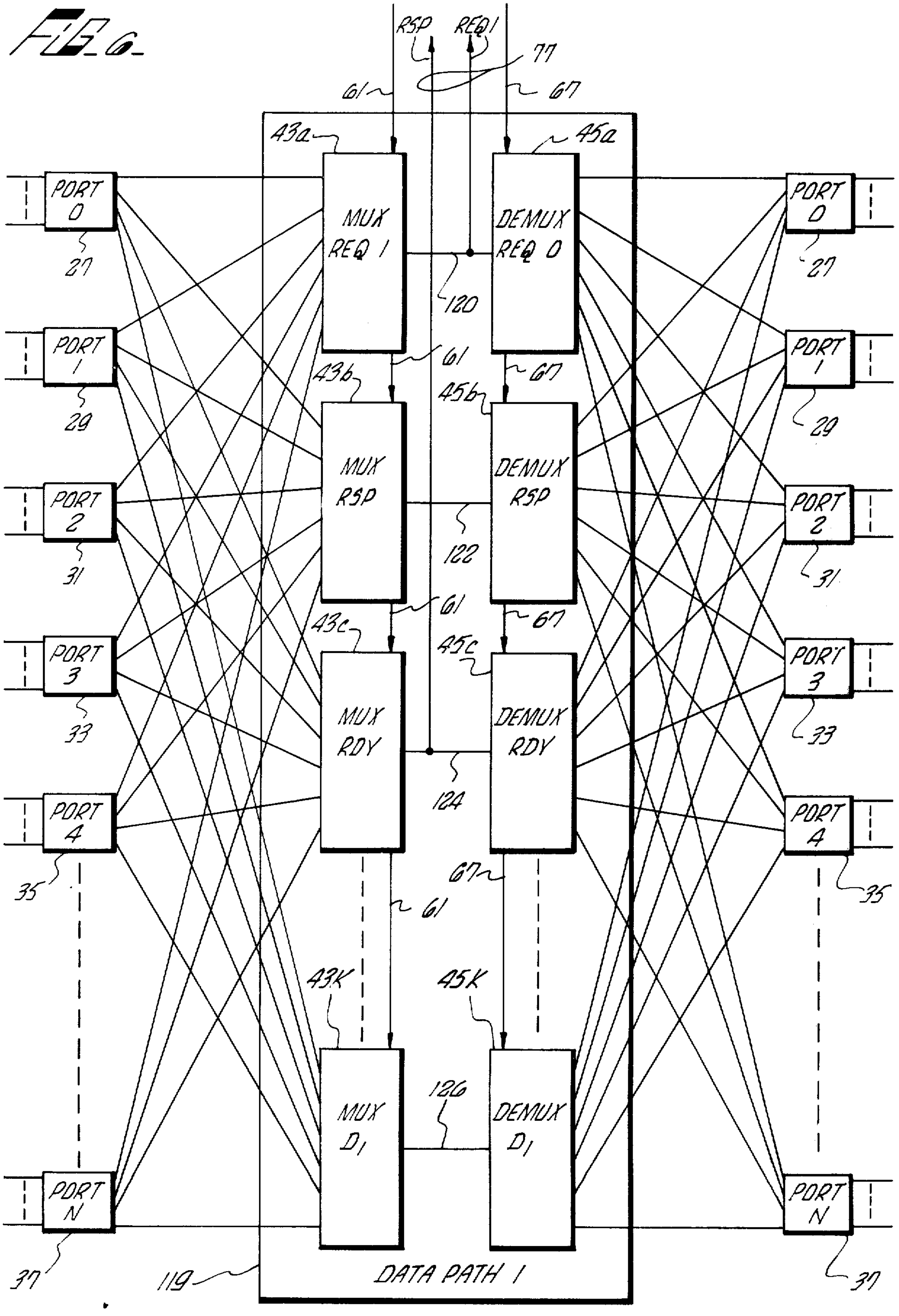
FIG. 6 illustrates in block diagram form the switching mechanism utilized in the switch controller of FIG. 4 for a single data path.

Referring now to FIG. 6, a single data path switching exchange mechanism 119 is illustrated. This data path switching mechanism is the data path multiplexer-demultiplexer pair 43–45 of FIG. 4. The number 1 multiplexer 143 of FIG. 4 is made up of a plurality of multiplexers **43*a* through 43*k*. The number of multiplexers making up a data path multiplexer equals the number of inbound unidirectional conductors coming from a single computer adapter, in other words, the number of inbound conductors in the data path cable connecting to an input-output computer port. Thus, each half-duplex conductor in a data path connecting a particular computer mechanism and the switch controller 39** (FIG. 4) has a multiplexer-demultiplexer pair.

The inbound request multiplexer **43*a* receives all the inbound request conductors from the computer devices 27 through 37 in the system. Thus, the single conductor 120 interconnecting multiplexer 43*a* and demultiplexer 45*a* carries request-to-send signals from any computer device in the system desiring interconnection with another device. Demultiplexer 45*a*** distributes or routes the particular request received to the designated computer or device.

The other multiplexer-demultiplexer pairs of the exchange mechanism 119 are similarly organized. Multiplexer **43*b* receives all outbound response signal conductors from the computer devices 27–37 and connects them to the outbound response distributing demultiplexer 45*b* over conductor 122. Multiplexer 43*c* receives all ready signal conductors from the computer devices 27–37 and connects them to the ready signal distributing demultiplexer 45*c* over conductor 124.**

This control signal line organization also follows for the data lines $D_8$ to $D_1$, the first data line. Thus, multiplexer **43*k* receives all the inbound conductors carrying data bit $D_1$ from the computer devices 27–37 and connects them to the $D_1$ distributing demultiplexer 45*k* over line 126.**

The switching action of the multiplexers making up the first data path 119 of the switch exchange controller 39 (FIG. 4) is controlled by its control logic 41 (FIG. 4) over cable 61. The switching action of the demultiplexers **45*a*–45*k* is likewise controlled by control logic 41 (FIG. 4) over cable 67. The connecting conductors between multiplexer-demultiplexer pairs that carry control signals, such as an inbound request on line 120 and an inbound response on line 124, supply information to control logic 41 (FIG. 4) over cable 77. These control signals direct the switching action commands that control logic 41** supplies to the various multiplexer-demultiplexer pairs.

Standard off the shelf integrated circuit chips may be used to construct the exchange of FIG. 6. Multiplexers **43*a* through 43*k* for example, may be made up of well known 16:1 multiplexer chips manufactured by the integrated circuit manufacturers. These particular multiplexer chips have a four bit address input which selects one of the sixteen incoming lines to be connected to the single outgoing line. The demultiplexers 45*a* to 45*k*** may be made up of well known 1:16 demultiplexer chips manufactured by the integrated circuit manufacturers. These particular chips are a one line to 16 line demultiplexer. The outgoing line is selected according to a four bit code.

Figure 7:
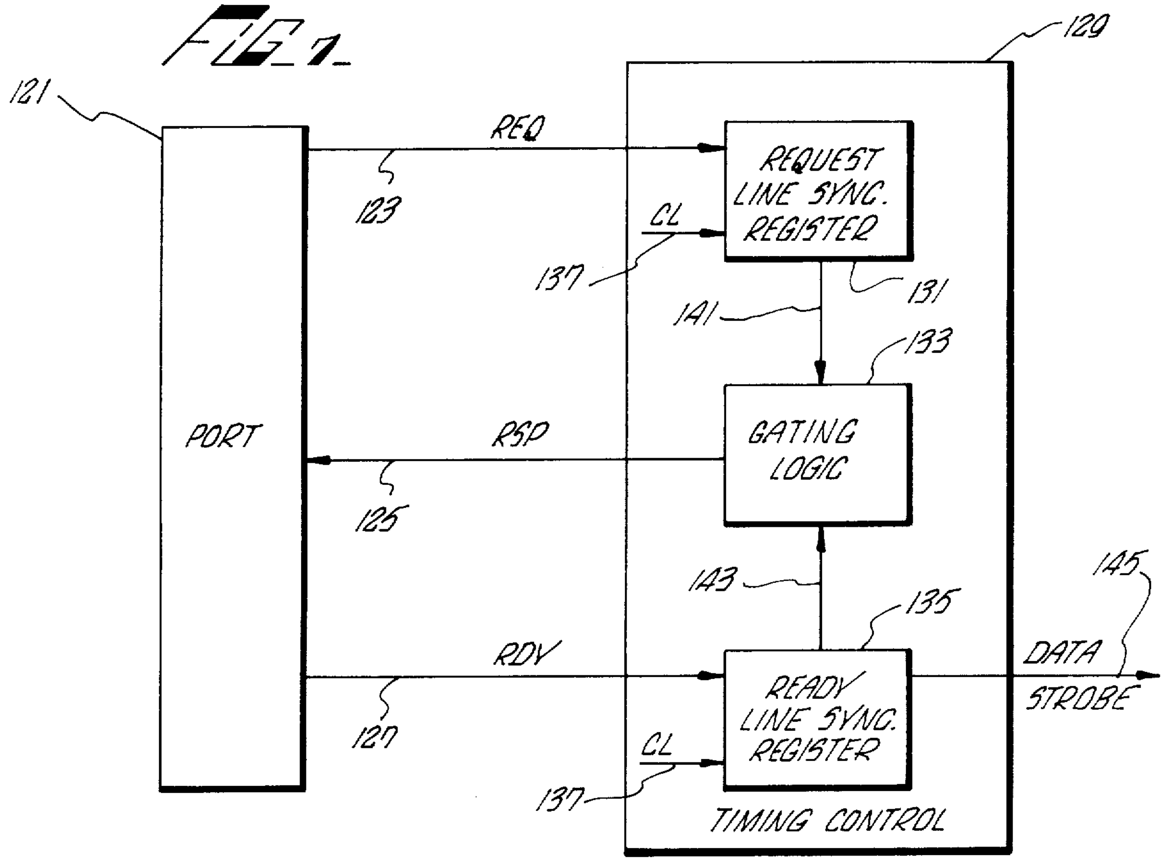
FIG. 7 is a block diagram illustration of the timing control found in the control logic of the switch controller.

Referring now to FIG. 7, timing control logic 129 that functions to clock data from a particular sending computer, by way its input/output port 121, to a receiving computer, is illustrated. The transmitting computer sends out a request signal over inbound request line 123 to a request line synchronizing register 131 which is a well known left/right shifting register. The request line register 131 insures that no output is produced on line 141 unless the request signal level has been present at the input of the register, on line 123, for at least two clock times. Clocking pulses from a clock source 201 (FIG. 10) are supplied to the request line register over clock input line 137. Request line register 131 found in the prior art, responds to a signal on line 123 by generating a response signal level on line 125 through simple gating logic 133. The response signal supplied to the computer over line 125 causes the computer to generate a ready signal which is supplied to the timing control logic 129 over ready signal line 127. The ready signal is received by ready line synchronizing register 135. The ready line synchronizing register 135 generates a data strobe pulse on line 145 only after at least two clock pulses have passed since the ready signal was received on line 127. The ready line synchronizing register 135 is a well known shift register apparatus. The design purpose for the request line synchronizing register 131, and the ready line synchronizing register 135 not responding at the exact instant input signals are received, is to insure that they will not be triggered into operation by spurious noise signals on the lines 123 and 127 from the computer port 121.

Figure 8:
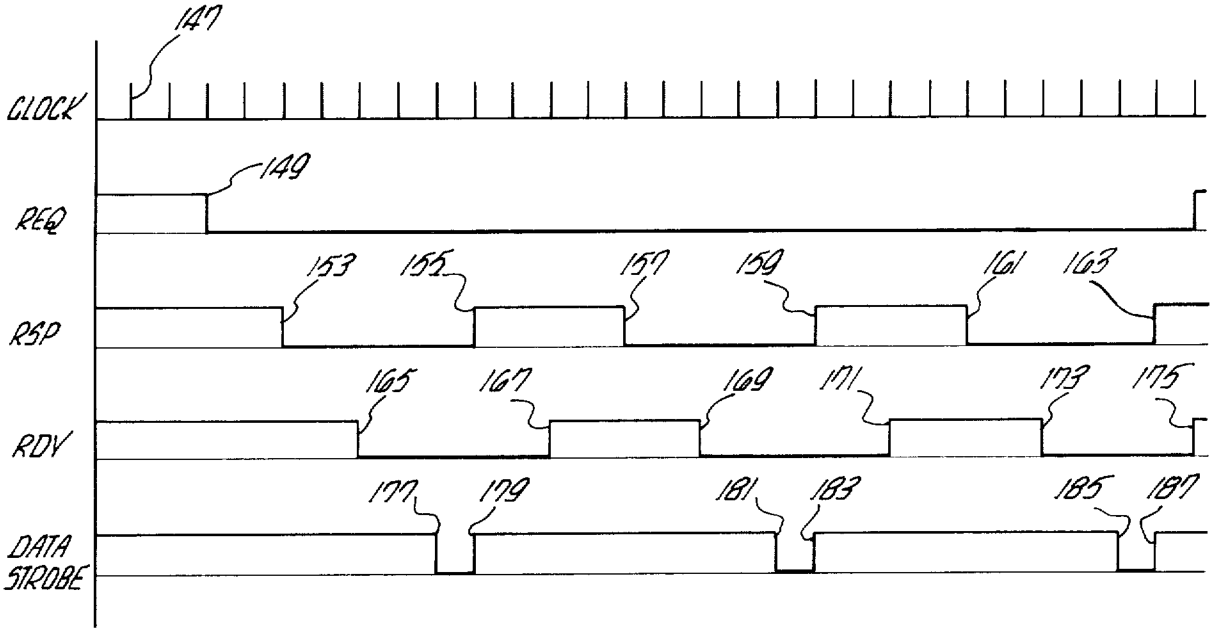
FIG. 8 is a pulse diagram illustrating the function of the timing control of FIG. 7.

Referring now to FIG. 8, the function of the timing control logic 129 (FIG. 7) in performing data strobing is illustrated. The output signal of a common clock source is shown as clock transitions 147. Upon the signal on the request line 125 going low 149, the request line synchronizing register 131 will respond thereto by generating a signal on the line 141 to the gating logic 133. The signal on line 141 is supplied on the second clock after the request line signal went low. The gating logic responds to the signal on line 141 to drop the signal level 153 on the response line 125. The computer connected to port 121 responds to this transition by causing the ready line to go low 165, two clock periods thereafter. In response to this transition, the occurrence ready line synchronizing register 135 generates a data strobe pulse 177–179 on line 145, two clock periods thereafter and triggers gating logic 133 into removing 155 the response signal from line 125. Removal of the response signal from line 125 causes the computer to remove 167 the ready signal from line 127. Since the request line 123 still carries a request signal, on the second clock pulse after removal 167 of the ready signal from line 127, gating logic 133 again supplies a response signal 157 to line 125. This signal causes the computer to react by sending a ready signal 169 to ready line synchronizing register 135. This ready signal causes the ready line register 135 to respond by generating a data strobe pulse 181–183 and triggering the gating logic 133 to again remove 159 the response signal from line 125. This causes the computer to remove 171 the ready signal from line 127. The removal of the ready signal with the request line 123 still low causes gating logic 133 to again generate a response signal 161. Occurrence of this signal again causes the computer to react by sending a ready signal 173 whereby ready line synchronizing register 135 responds thereto by generating another data strobe pulse 185–187. For the example, the end of the last computer generated ready signal 175, the computer also removed the request signal 151 from line 123, thereby indicating that no further transmission was desired. At the generation of the data strobe pulse 185–187, the gating logic again removes 163 the response signal from line 125. Since computer no longer desires to communicate, all transmission between the computer and timing control logic 129 ceases.

OUTBOUND ADDRESS GENERATOR

Figure 9:
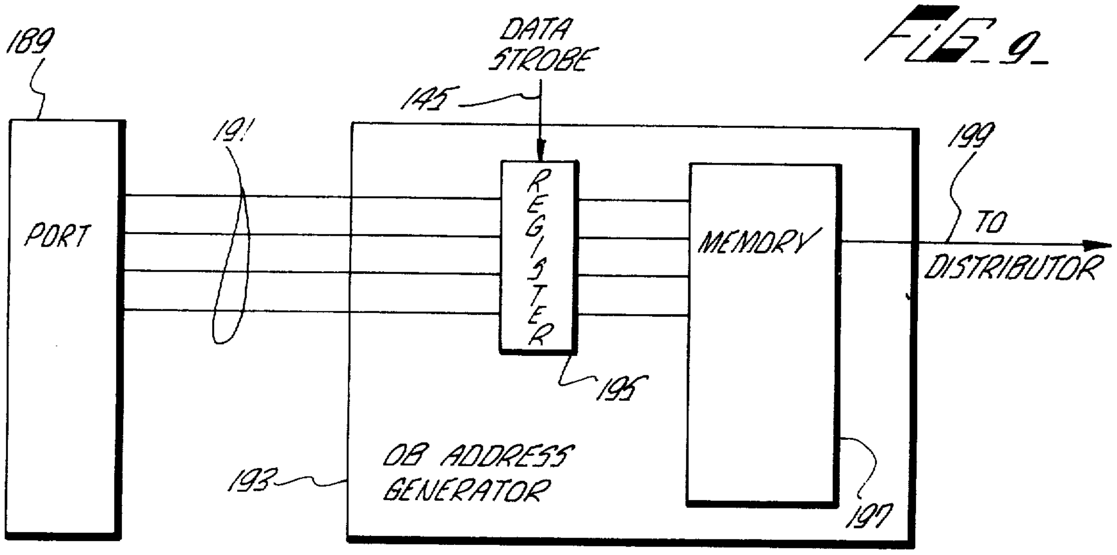
FIG. 9 is a block diagram illustration of the outbound address generator utilized in the control logic of the switch controller.

Referring now to FIG. 9, an outbound address generator 193 is seen as receiving input data from a computer port 189 over multiple conductor cable 191. An outbound address code received by the outbound address generator 193 over cable 191 is clocked into register 195 by the data strobe pulses generated by the timing control logic 129 (FIG. 7) over line 145. The outbound address code register 195 addresses a random access memory 197. This memory contains a plurality of outbound addresses which identify the plurality of receiving devices in the processor system. The identifying addresses are supplied to a distributor 205 (FIG. 10) and comparator circuit 209 (FIG. 10).

The memory 197 may be one of the many integrated circuit memories available from integrated circuit manufacturers. For example, a 64 bit, 16 × 4 random access memory may be utilized. By utilizing a random access memory to generate the actual outbound addresses, a reassignment of the computer mechanisms that are intercommunicating by way of the exchange system of this invention would only require the writing of new outbound addresses in the appropriate storage location in memory, rather than rearranging the physical cable connections.

Control Logic

Figure 10:
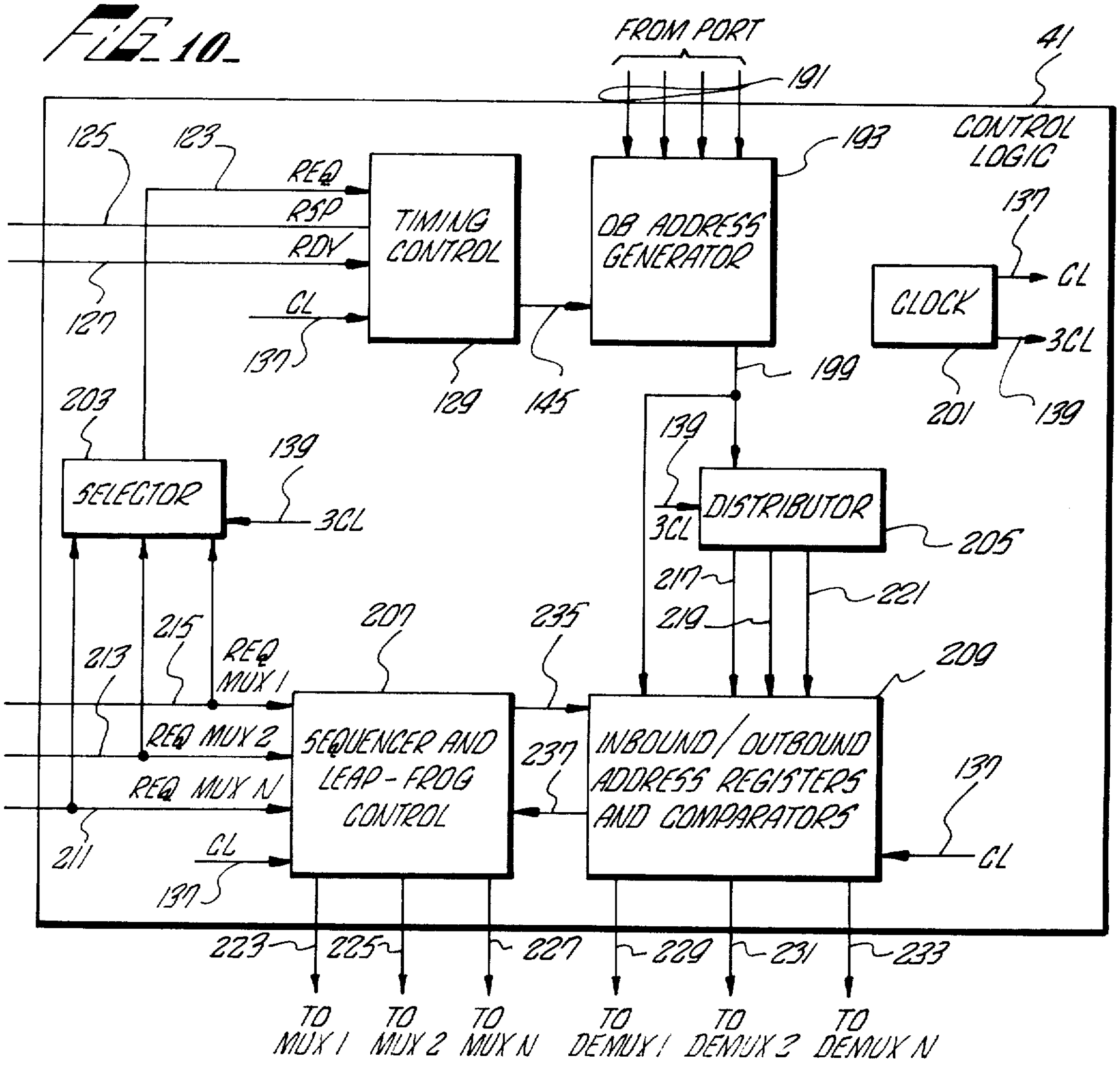
FIG. 10 is a block diagram illustration of the interaction of all the elements in the control logic utilized in a switch controller.

Referring now to FIG. 10 the control logic 41 for the multiple data path hardware exchange system of this invention is illustrated. The control logic 41 contains a clock source 201 which is well known in the art and has a first clock output on line 137, at a first rate, and a second clock output on line 139 at, for example, three times the first rate. This clock source is supplied to all equipment requiring timing control in the switch control interchange. As the data path scanning multiplexers 43, 47 and 51 (FIG. 4) are rapidly scanning the various ports for request-to-send signals, the states of the request lines are continuously supplied to sequencer and leap-frog control 207 over request lines 211, 213 and 215. When a request signal is received on one or more of these lines, sequencer and leap-frog control 207, as will be more fully explained hereinafter, generates a stop-scan signal to the appropriate data path multiplexer over cable 223, 225 or 227.

Assuming now that one of the request lines coming into sequencer and leap-frog control 207 carries a request signal, a selector 203, which is driven by a clock rate, supplied on line 139 that is three times as fast as the normal clock rate, connects the request signal to timing control logic 129, over request line 123. By providing a clock rate to selector 203 that is three times as fast as the clock rate supplied to timing control 129 over line 137, timing control logic 129 is thereby time shared between the three illustrated independent data paths. It should be understood that a two path system would only require a two phase clock to be supplied to the selector 203. The selector utilized for this example of these independent data paths may be an off the shelf, 4:1 selector manufactured by the integrated circuit manufacturers.

As the request signal is received on line 123 by the timing control logic 129 it will trigger the timing control 129 into its response and ready cycle, as explained in conjunction with FIGS. 7 and 8, thereby generating data strobing pulses, on line 145, to the outbound address generator 193. As was explained, the outbound address generator 193 receives address codes over input cable 191 and generates outbound addresses that are supplied to distributor 205 and has the same clock as the selector 203. The distributor 205 can be, a 1:4 demultiplexer, manufactured by all the integrated circuit manufacturers. The output of this distributor 205 are supplied over register cables 217, 219 and 221 to respective outbound address registers in inbound/outbound address register and comparators circuit 209.

The comparators circuit 209 compares the inbound addresses being generated by the sequencer and leap-frog control 207 with the outbound addresses being received from the outbound address generator 193 by way of the distributor 205. Upon certain coincidences, the comparator 209 generates signals over cable 237 to the sequencer 207 which direct it to resume scanning. In addition, the occurrence of certain coincidences in the comparator 209 prevents the outbound address generated by outbound address generator 193 from being supplied to the demultiplexers over cables 229, 231 or 233. Exactly how the sequencer 207 and comparator 209 accomplish the above will now be explained.

Sequencer and Leap-Frog Control

Figure 11:
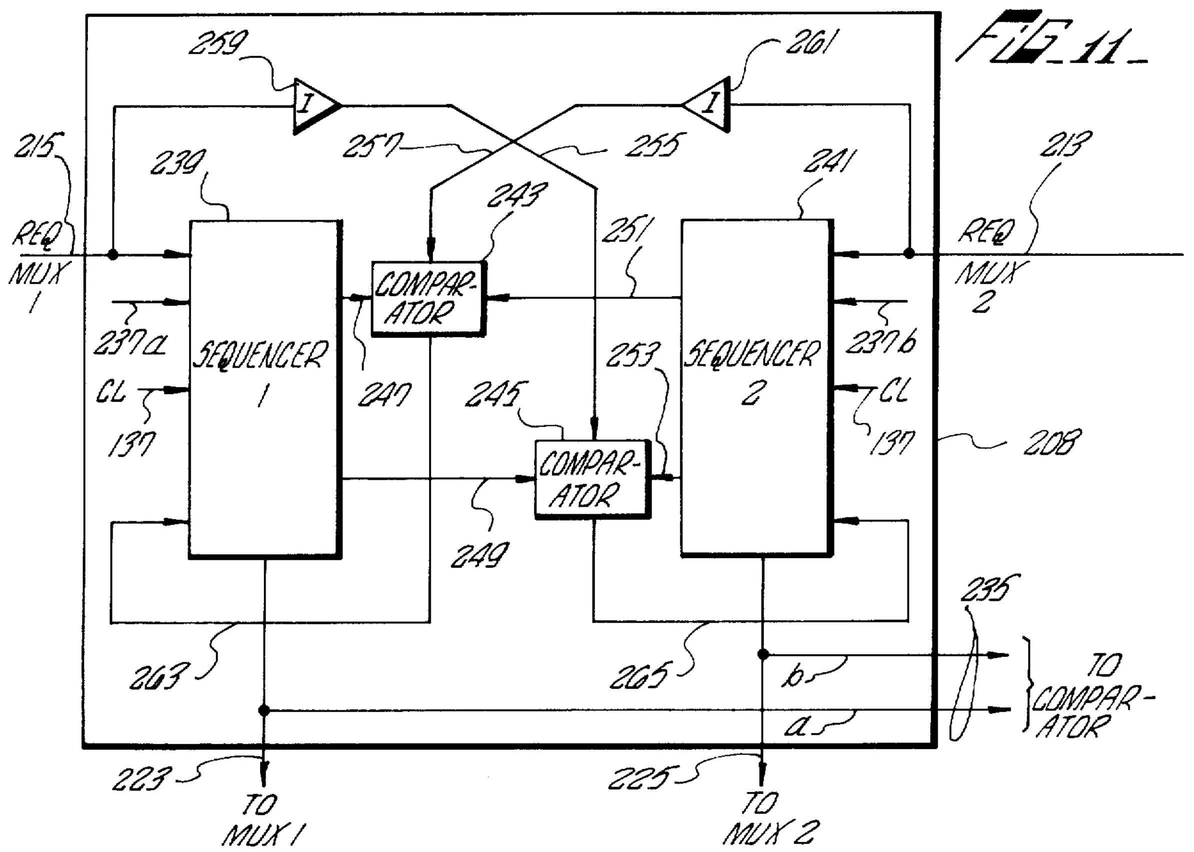
FIG. 11 is a block diagram illustration of a sequencer and leap-frog control mechanism for controlling the simultaneous operation of two independent data path switching mechanisms.

Referring now to FIG. 11, a sequencer and leap-frog control 208 that may be used in the control logic 41 (FIG. 4) is illustrated. For purposes, such as, ease of understanding and explanation, the sequencer and leap-frog control 208 of FIG. 11 represents a sequencer and control that would be utilized for a two path switch controller, that is, a switch controller that has two independent data path multiplexer-demultiplexer pairs. Each data path multiplexer has a sequencer assigned to it. Thus, number 1 sequencer 39 controls data path multiplexer 43 (FIG. 4) by sending switching addresses to the multiplexer over cable 223. Number 2 sequencer 241 controls data path multiplexer 47 (FIG. 4) by sending switching addresses to it over cable 225. Besides sending these switching or inbound addresses to their respective multiplexers, the sequencer and leap-frog control 208 sends these addresses to the inbound/outbound address comparator 137 (FIG. 10) over cable 235.

Figure 4:
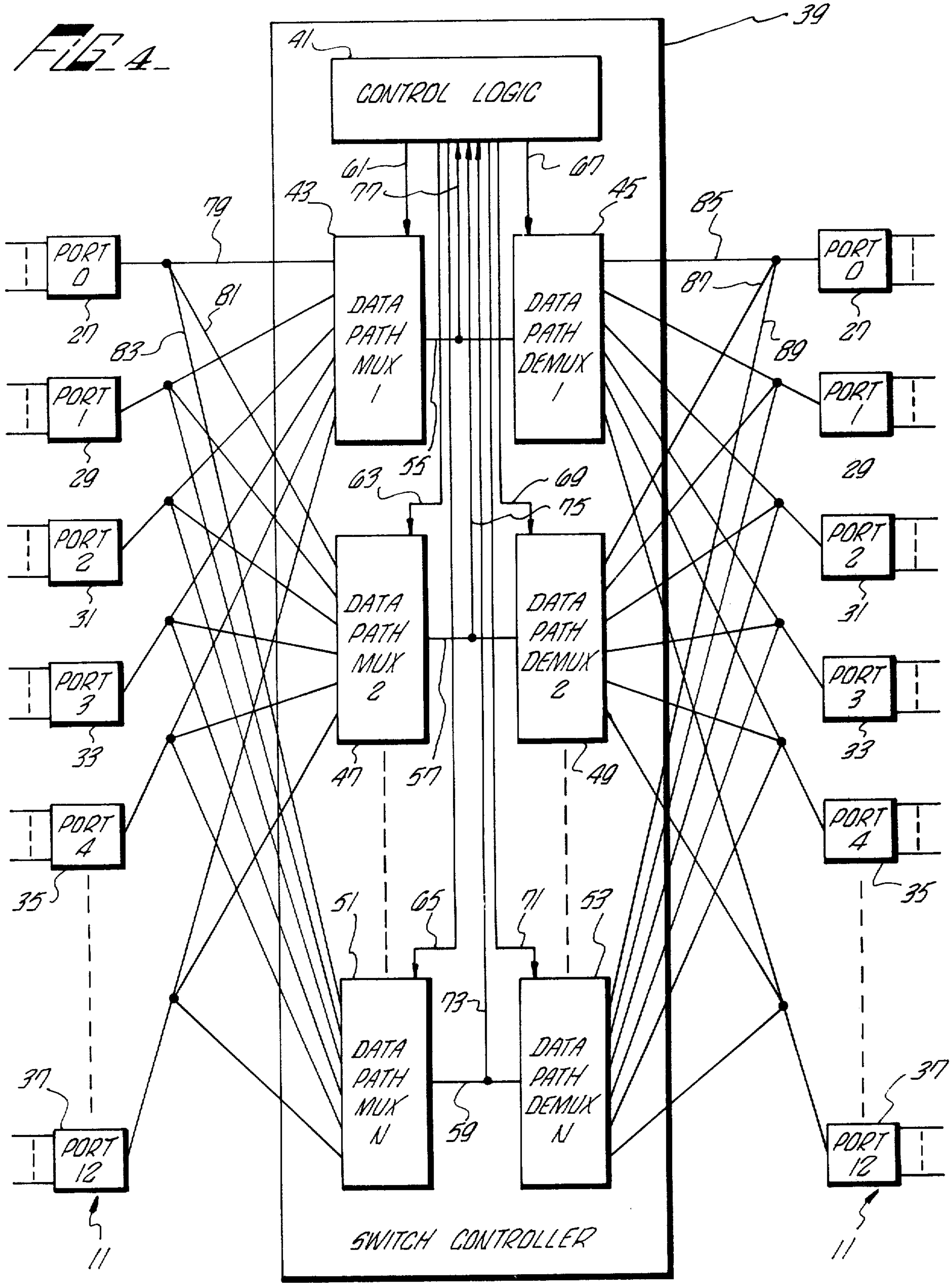
FIG. 4 is a block diagram illustration of a multiple simultaneous data path exchange system for a plurality of computers.

Number 1 sequencer 239 receives the inbound requests detected by number 1 data path multiplexer 43 (FIG. 4). This request signal, when absent enables number 1 sequencer 239 and when present, disables number 1 sequencer 239. In other words, when a request-to-send signal is received by the sequencer 239 the sequencer stops scanning. In addition to request-to-send signals, the sequencer receives clock signals over clock input line 137 and enabling signals over line 237a from the inbound/outbound address comparators 209 (FIG. 10). Number 1 sequencer 239 also receives a leap-frog constant select signal from a comparator 243, over line 263.

Number 2 sequencer 241 of the sequencer and leap-frog control 208 receives the request-to-send signals detected by the number 2 data path multiplexer 47 (FIG. 4) over line 213. This sequencer also receives enable signals over line 237 from the inbound/outbound address comparators 209 (FIG. 10). The sequencer 241 receives clock pulses over clock input line 137. A comparator 245 supplies the number 2 sequencer 241 with a leap-frog constant selecting signal over line 265.

The comparators 243 and 245 used in the sequencer and leap-frog control 207 are bit magnitude comparators that are well known in the art and manufactured by integrated circuit manufacturers.

Comparator 243 compares the binary address next to be generated by number 1 sequencer 239, on line 247, with the binary address being generated by number 2 sequencer 241 on line 251. The comparator 243 is enabled whenever number 2 sequencer 241 stops its scanning as a result of a request-to-send signal coming in on request line 213. Thus, whenever a high to low transition occurs on line 213, an inverter 261 produces an enable signal on line 257 to enable comparator 243.

Comparator 245 compares the address presently being generated by number 1 sequencer 239 on line 249 with the next to be generated address by number 2 sequencer 241 on line 253.

Comparator 245 is enabled whenever a request signal coming in on line 215 stops number 1 sequencer 239, causing an inverter 259 to generate an enabling signal on line 255 for comparator 245.

Figure 12:
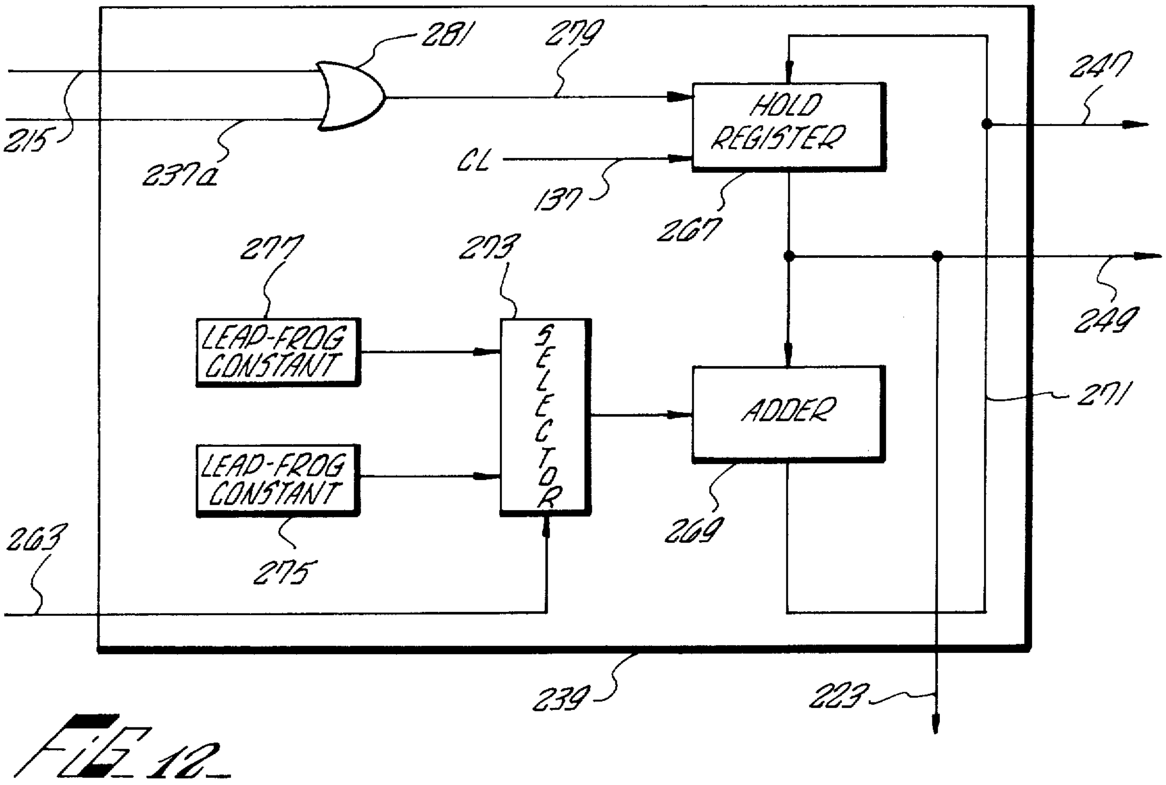
FIG. 12 is a block diagram and logic circuit illustration of a sequencer mechanism used in the sequencer and leap-frog control mechanisms of FIG. 11.

For a better understanding of the function of the sequencers 239 and 241, references is now made to FIG. 12 which illustrates the contents of the sequencer 239 for the number 1 data path multiplexer. It should be understood, however, that the other sequencer 241 is identical in structure. Sequencer 239 contains an address hold register 267. This register is a parallel-in parallel-out register. The register 267 is enabled by an enabling signal level on line 279. A clock signal on input line 137 causes loading of the hold register 267 whenever an enable signal is present on line 279. A register chip that may be utilized for this purpose is manufactured by integrated circuit manufacturers.

The output of the hold register 267 is supplied, in this example, to a full adder 269. A full adder that may be utilized for this purpose is manufactured by integrated circuit manufacturers. The other input to adder 269 comes from a 2:1 selector 273. The function of selector 273 is to connect one of the leap-frog constants 277 or 275 to the input of adder 269. Selector 273 may be a readily available two input data selector that is manufactured by integrated circuit manufacturers. The sum of the chosen leap-frog constant, and the output of the hold register 267, generated by adder 269, is supplied over line 271 to the input of the hold register 267, and clocked into same.

If, however, a request-to-send signal is received from a computer being addressed by the output of the hold register 267 over cable 223, the comparator 243 is enabled at the same time that the loading of the hold register is disabled. The output of the adder 269 will then be compared with the output of the hold register in the number 2 sequencer 241 (FIG. 11). If there is a coincidence, comparator 243 will generate a select signal on line 263 that is supplied to the 2:1 selector 273 to pick another leap-frog constant, thereby causing the output of the adder 269 to change.

To better understand the operation and interaction of the leap-frog constants 275, 277 with the hold register 267 and adder 269, consider a simple example. Assume the leap-frog constant 275 is a four digit binary number (0001) representing one and constant 277 is a four digit binary number (0010) representing two. The contents of hold register 267 may be four binary zeros to start or any other four digit combination. For purposes of example, assume that the starting address in the hold register 267 is four zeros. The first output address supplied to the number 1 multiplexer 43 of the switch control exchange 39 (FIG. 4) is then four zeros. Assuming no request-to-send signal is received from the computer at this address, the register 267 is not disabled and the comparator 243 is not enabled. As a result, selector 273 does not receive a select signal and thereby connects the binary one constant to the adder 269. The output of the adder then is binary 1 (0001). This is clocked into the hold register and becomes the next inbound address for the number 1 multiplexer 43 (FIG. 4).

Assume now, that the computer at this address (0001) is generating a request-to-send signal. This signal disables hold register 267 and enables comparator 243. As a result, this binary one is compared with the present output of the hold register in the number 2 sequencer 241 (FIG. 11). Assuming that no comparison occurs, because number 2 sequencer 241 started sequencing from a different start point, comparator 243 does not generate a select signal thereby causing the selector 273 to supply a binary 1 (0001) to the adder 269. After completion of transmission the request signal is removed and hold register 267 is again enabled. At this time, a binary 2 (0010) will be clocked into the register. This address is the result of a binary 1 constant (0001) being added to the binary 1 (0001) output of the hold register 267 in the adder 271. As long as there are no comparator coincidences, this type of scanning action continues, the address being generated on line 223, by the output of hold register 267, being sequenced in order.

Assume now that the output of the hold register 267 is a binary 5 (0101) and the output of the adder 269 a binary 6 (0110). Assume also that the computer located at address five is sending a request-to-send signal. As a result the output of adder 269 (0110) is supplied to an enabled comparator 243 (FIG. 11) over line 247, for comparison with the output of the hold register in the number 2 sequencer 241. Assume that a coincidence exists, in other words, the output of the hold register in the number 2 sequencer is also 0110. This occurs if, for example, sequencer number 2 has stopped on address number 6 in response to a request signal from the computer having that address. At the occurrence of a compare, the comparator 243 (FIG. 11) generates a select signal on line 263 that causes selector 273 to choose the leap-frog constant 277 representing a binary 2 count (0010). This four digit binary number representing two would be added to the output of hold register 267 which would be a four digit binary number representing 5 or (0101). The sum of these two four digit binary numbers would be 7 (0111). Assuming that upon completion of transmission by the computer at address five, the comparison still existed, this four digit binary number (0111) would be clocked into hold register 267 and supplied as the next address to the number 1 data path multiplexer 43 (FIG. 4) over line 223. As can be seen, this is a jump or leap-frog over the number six position which was occupied by the number 2 sequencer 241 (FIG. 11).

It can be seen then, that as long as comparator 243 is not generating a compare indication on line 263, the selector 273 will be supplying a binary one constant to the adder 269 and the number 1 sequencer 239 will be generating an address sequence without any skips. It should be understood that if more than two data paths were desired additional leap-frog constants would be made a part of this circuitry and be selected in order to provide for the situation where a pair or plurality of sequencers are stopped next to each other and a scanning sequencer has to jump over two or more of them.

The enable signal on line 279 to hold register 267 permitting the clock signal on line 137 to clock data into the hold register 267 is generated by an OR gate 281. One input to OR gate 281 is a request-to-send signal on line 215 from the number 1 data path multiplexer 43 (FIG. 4). The request signal on line 215, as was indicated when describing the timing control logic 129 (FIG. 7) in conjunction with the wave forms of FIG. 8 is a low signal level. In other words, whenever the line is high no request is being made. Whenever the signal level on line 215 is high, therefore, the signal level on line 279 should be high thereby enabling the clocking of data into hold register 267, baring other conditions generated by inbound/outbound address comparator 209 (FIG. 10).

As will be more fully explained hereinafter, the comparators 209 (FIG. 10) generate a signal on line **237*a*, which signal overrides the disabling request signal on line 215 and starts or enables the clock signal on line 137 for loading information into hold register 267. Thus, if there is a high signal level on line 237*a*, OR gate 281 will generate a high level on line 279. The high level on line 237*a* will cause line 279 to be high even though line 215 is low representing a request-to-send signal. The high level on line 279, enables the inputting of data to hold register 267. The only time that hold register 267 is not permitted to load data is when both the signals on line 215 and line 237*a* are low. This produces a low level on line 279**.

Inbound/Outbound Address Comparators

Figure 13:
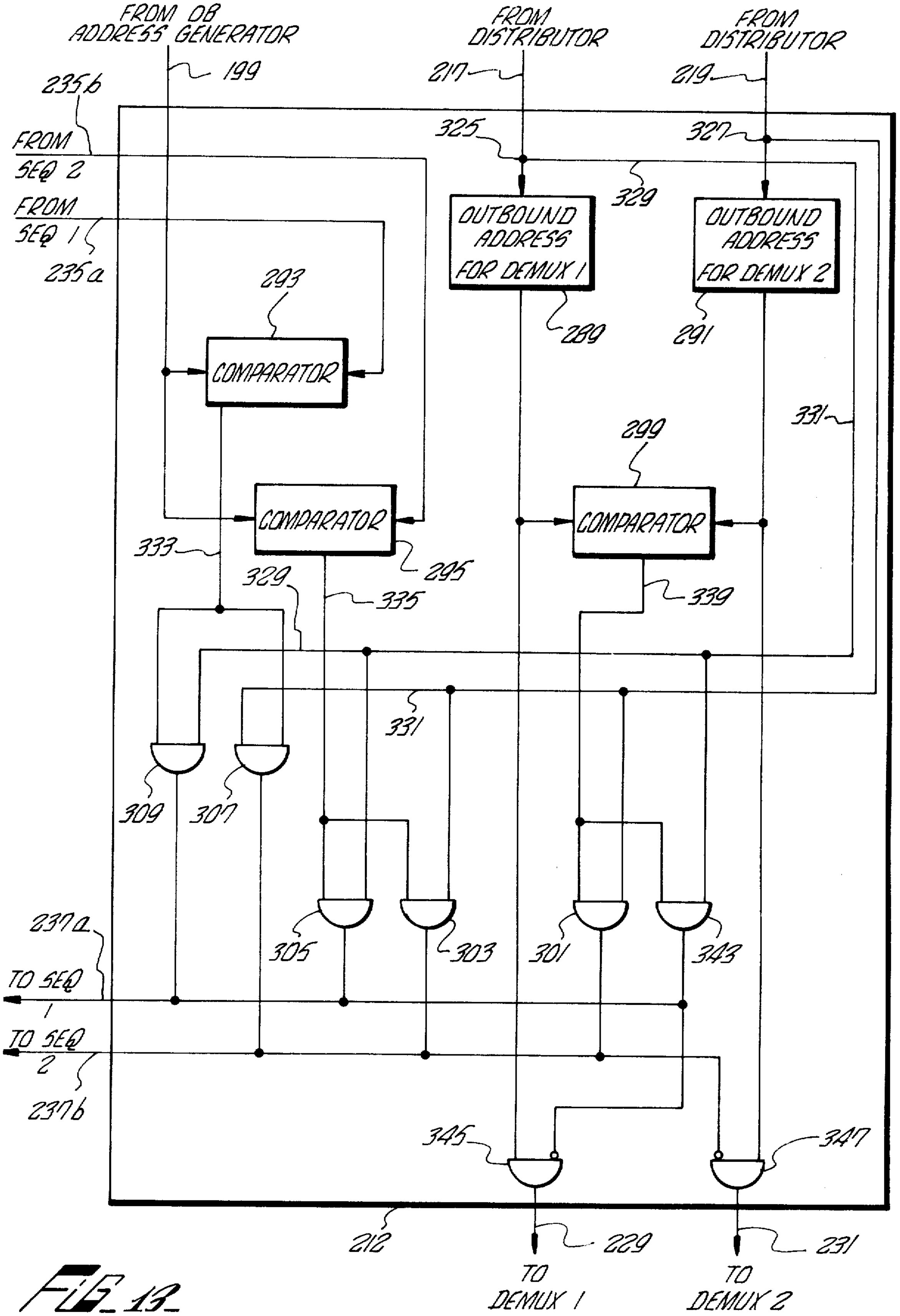
FIG. 13 is a block diagram and logic circuit illustration of an inbound/outbound address comparator mechanism utilized in the control logic of FIG. 10.

Refer now to FIG. 13 which is a more specific representation of the inbound/outbound address registers and comparators 209 of FIG. 10. This comparator configuration is for a two data path exchange and would be used with the sequencer and leap-frog control of FIG. 11. The generation of a signal on line **237*a* to be supplied to the sequencer leap-frog control 207 (FIG. 10) will be explained in connection therewith. The inbound addresses from the number 1 sequencer 239 and the number 2 sequencer 24 of the sequencer and leap-frog control 208 are supplied to the inbound/outbound address registers and comparators circuit 212, over cable 235*a* and 235*b*. Comparator circuit 212 also receives the outbound address being generated by outbound address generator 193 (FIG. 10), over cable 199. This same address is also loaded into its appropriate outbound address register 289 or 291 by the distributor 205 (FIG. 10). Distributor 205, as was explained, is a demultiplexer being hardwired, by way of cable 217 and 219, to outbound address register 289 and outbound address register 291**.

Comparators 293, 295 and 299 may be identical binary comparators that are well known in the art and manufactured by integrated circuit manufacturers.

Comparator 293 compares the address generated by outbound address generator 199 with the address being supplied by the number 1 sequencer 239 (FIG. 11). If there is a coincidence between these two addresses, comparator 293 generates a compare indication on line 333 that is supplied to AND gates 307 and 309. At the same time that outbound address generator (FIG. 10) is supplying the outbound address over line 199 to inbound/outbound comparators 212, the distributor 205 (FIG. 10) is supplying the same address to outbound address register 289 or outbound address register 291.

Assume, for the purposes of example, that the outbound address received is supplied to the number 1 distributor or demultiplexer 45 (FIG. 4) register 289, at the time comparator 293 is making its comparison. AND gate enabling line 329 will go high because an address input to the outbound address register 289 will cause junction 325, which may be a multiple input OR gate to generate a high level. A high on line 329 enables AND gates 309 and 305. Since comparator 293 generated a compare indication, this compare indication will be passed by AND gate 309 to the number 1 sequencer 239 (FIG. 11) over line 237*a*. What this coincidence condition means is that the inbound address for the first data path is the same as the outbound address. Thereby, the sending computer is trying to address itself. By generating a signal on line 237*a* the comparator logic 212 causes the number 1 sequencer 239 (FIG. 11) to start scanning again, in the manner explained in conjunction with FIG. 12. The signal level on line 237a will also disable multiple input AND gate 345 and prevent the address loaded into register 289 from addressing the number 1 data path demultiplexer 45 (FIG. 4).

Comparator 295 compares the address being generated by the outbound address generator on line 199 with the address being supplied by the number 2 sequencer 241 (FIG. 11). Assume again, for purposes of example, that the outbound address generated by the outbound address generator 193 is for the number 1 demultiplexer 45 (FIG. 4) and is, therefore, supplied to outbound address register 289. The output of comparator 295 will therefore be passed by AND gate 305. A sequencer enabling signal on line 237*a* will be supplied to number 1 sequencer 239 (FIG. 11). What this compare indication means is that the outbound address for the first data path is the same as the inbound address for the second data path. Or, in other words, the first data path is trying to address a computer that is being serviced by the second data path. The signal to the number 1 sequencer will enable it to start scanning again and disable multiple input AND gate 345 to prevent the outbound address from being supplied to the number 1 demultiplexer 45.

Assume now that the address being generated by the outbound address generator 193 is for the number 2 data path demultiplexer 49 (FIG. 4). If comparator 293 generates a compare indication under this condition, that means that the number 2 data path demultiplexer 45 is settling on an address that the number 1 data path multiplexer 43 has stopped on. As a consequence, comparator 293 will generate a compare indication that will be passed by AND gate 307 to start the number 2 sequencer scanning again and prevent the multiple input AND gate 347 from passing this outbound address to the number 2 data path demultiplexer 49 (FIG. 4). AND gate 307 will be enabled by an enabling signal on line 331 generated by logic at point 327 which could be a multiple input OR gate.

If the outbound address being generated by outbound address generator 193 were equal to an address coming from number 2 sequencer 241, comparator 295 would recognize this condition. This would mean that the computer connected to the address on which the number 2 data path multiplexer stopped is trying to address itself. A compare indication, from comparator 295 would be passed by AND gate 303 to start the number 2 sequencer scanning again and prevent the content of the outbound address register from being supplied to the number 2 data path demultiplexer 49 (FIG. 4).

Comparator 299 compares the contents of outbound address register 289 with the contents of outbound address register 291. Two AND gates 301 and 343 receive the compare indication from comparator 299. AND gate 301 is enabled whenever an address is being loaded into outbound address generator 293. Logic at point 327 (multiple input OR gate) detects this condition. This OR gate would generate a high enabling level for AND gate 301. Assuming a compare indication was generated, a compare indication would be sent to the number 2 sequencer on line 273*b* instructing the number 2 sequencer to continue scanning and disable AND gate 347, preventing passing the address in the number 2 demultiplexer 291 over cable 231. This condition occurs whenever, in the particular example illustrated, the first data path has been established between the number one multiplexer and demultiplexer thereby storing an outbound address in register 289 with the second data path trying to address the same destination by bringing in the identical address in outbound address register 291.

SUMMARY

In summary, what has been disclosed is a multiple data path system for interconnecting computer pairs in a multi-computer system which establishes simultaneous multiple independent and unidirectional data paths between them. Scanning of the computers for request-to-send signals is accomplished without interferring with already established data paths. The compatable scanning of a plurality of scanning devices is accomplished by the utilization of leap-frog logic. In the case when an addressed computer, or the intended receiver is busy, the scanning mechanism attempting to establish the data path is instructed to resume scanning. The leap-frog logic and control mechanism that provides for leap-frog scanning is easily adaptable for use with a plurality of different leap-frog constants.

Obviously, many modifications and variations of the present invention are possible in light of the above teachings. It is therefore to be understood that within the scope of the appended claims, the invention may be practiced otherwise then as specifically described.

What is claimed is:

1. In a multi-computer processor system wherein a plurality of computers generate request-to-send signals indicating a desire to be connected to another computer or device over one of N independent unidirectional data paths, a multiple data path hardware exchange system, comprising:

N scanning means, each of said scanning means connecting and disconnecting a first end of a data path from the output lines of each said computers;

sequencing means for directing the sequential connecting and disconnecting of each said N scanning means, said sequencing means responding to a request-to-send signal from a particular computer by maintaining a scanning means connected to said particular computer, said sequencing means causing all other scanning means to leap-frog the connected scanning means; and N distribution means, each of said distribution means connecting the second end of the data path to the input lines of another computer or device.

2. The multiple data path hardware exchange system of claim 1 wherein each of said N scanning means comprises X, Y:1 multiplexers, X being the number of output lines per data path and Y being the number of computers and devices in said processor system.

3. The multiple data path hardware exchange system of claim 1 wherein said sequencing means comprises:
means for generating inbound addresses for each of said N scanning means;
means for detecting when a particular scanning means is quiescent at a particular address; and
means for directing said inbound address generating means to leap-frog the inbound address at which said particular scanning means is quiescent.

4. The multiple data path hardware exchange system of claim 3 wherein said means for generating inbound addresses comprises: N sequencers, each sequencer generating an address for its respective scanning means.

5. The multiple data path hardware exchange system of claim 4 wherein said detecting means comprises: a plurality of comparators, each comparator comparing the next address to be generated by a first sequencer with the present address of a second sequencer.

6. The multiple data path hardware exchange system of claim 3 wherein said leap-frog directing means comprises: a leap-frog constant store means.

7. The multiple data path hardware exchange system of claim 3 wherein said means for generating inbound addresses comprises N sequencers, each sequencer comprising:
an address hold register; and
a full adder receiving the output of said address register as a first input and supplying its output to the input of said hold register.

8. The multiple data path hardware exchange system of claim 7 wherein said detecting means comprises: a plurality of comparators, each comparator comparing the output of said full adder in a first sequencer with the output of said hold register in a second sequencer.

9. The multiple data path hardware exchange system of claim 8 wherein said directing means comprises N directing means, each directing means comprising:
a storage means containing a plurality of leap-frog constants; and
means responsive to a particular said comparator for selecting a leap-frog constant from said storage means and supplying it to said full adder as a second input.

10. The multiple data path hardware exchange system of claim 7 wherein said directing means comprises:
a storage means containing a plurality of leap-frog constants; and
means responsive to a particular said comparator for selecting a leap-frog constant from said storage means and supplying it to said full adder in one of said N sequencers.

11. The multiple data path hardware exchange system of claim 3 further comprising:
an outbound address generating means responding to a destination code from a computer for generating outbound addresses for each of said N distribution means; and
an inbound/outbound address comparator means for comparing addresses from said outbound address generating means and address from said inbound address generating means.

12. The multiple data path hardware exchange system of claim 11 wherein said outbound address generating means comprises:
a register means for receiving a destination code from a computer by way of said scanning means; and
a memory means responsive to the destination code in said register means for generating an outbound address.

13. The multiple data path hardware exchange system of claim 11 wherein said inbound/outbound address comparator means comprises:
a plurality of binary comparator means,
a first comparator means comparing the present outbound address with an inbound address for one of said N scanning means; and
a second comparator means comparing the present outbound address with a previous outbound address generated by said outbound address generating means.

14. The multiple data path hardware exchange system of claim 13 further comprising: means for routing indications of a match from said plurality of comparator means in said inbound/outbound address comparator means to respective inbound address generating means.

15. The multiple data path hardware exchange system of claim 1 wherein each of said N distribution means comprises: X, 1:Y demultiplexers, X being the number of input lines per data path and Y being the number of computers and devices in said processor system.

16. In a multi-computer processor system wherein a plurality of computers generate request-to-send signals indicating a desire to be connected to another computer or device over one of N independent unidirectional paths made available by N scanning means and N distribution means, an interchange control mechanisms for regulating said scanning means and distributing means, comprising:
timing control logic responsive to request-to-send signals from said plurality of computers, transmitted to said timing control logic by said N scanning means;
scanning control means responsive to request-to-send signals received from said N scanning means for controlling the movement of said N scanning means by generating inbound addresses for said N scanning means;
an outbound address generator for receiving an address code from a computer that has had its request-to-send signal acknowledged by said timing control logic, and generating on outbound address for a particular one of said N distribution means; and
comparator means for receiving inbound addresses from said address generator and comparing them.

17. The interchange control mechanism of claim 16 wherein said scanning control means comprises:
N sequencing means, one for each of said N scanning means, for generating inbound addresses for their respective scanning means; and
a plurality of comparator means, a first comparator comparing the next address to be generated by a first of said N sequencing means with the address presently being generated by a second of said N sequencing means.

18. The interchange control mechanism of claim 17 wherein said N sequencing means each comprises:

an address hold register; and a binary full adder receiving the output of said address register as a first input and supplying its output to the input of said hold register.

19. The interchange control mechanism of claim 18 wherein said N sequencing means each further comprises:

storage means containing a plurality of binary leap-frog constants; and selector means responsive to said comparator means for selecting one of said leap-frog constants and supplying it to said full adder as a second input.

20. The interchange control mechanism of claim 16 wherein said comparator means comprises:

a plurality of binary comparator means, a first comparator means comparing the present outbound address with an inbound address for one of said N scanning means; and a second comparator means comparing the present outbound address with a previous outbound address generated by said outbound address generating means.

21. The interchange control mechanism of claim 20 further comprising: means for routing indications of a match from said plurality of comparator means to respective said scanning control means.

22. A binary address generator for simultaneously stepping a plurality of scanning devices, comprising:

a plurality of sequencers, equal in number to said scanning devices, each sequencer generating a sequence of multiple bit codes; and a plurality of comparators connected between said plurality of sequencers and comparing the multiple bit codes from said plurality of sequencers, a first comparator comparing the multiple bit code to be released by a first sequencer with the multiple bit code being released by a second sequencer.

23. The binary address generator of claim 22 wherein said first comparator is enabled whenever said second sequencer is disabled.

24. The binary address generator of claim 22 further comprising: means responsive to a compare indication from a comparator for changing the sequence of a particular sequencer of said plurality of sequencers.

25. The binary address generator of claim 24 wherein said sequence changing means comprises:

storage means containing a plurality of binary bit codes; and selector means for selecting one of said binary bit codes.

26. The binary address generator of claim 22 wherein each sequencer of said plurality of sequencers comprises:

a hold register for a plurality of binary bits; and a full adder having a first input connected to the output of said hold register and its output connected to the input of said hold register.

27. The binary address generator of claim 26 further comprising:

storage means containing a plurality of binary bit codes; and selector means for selecting one of said binary codes and supplying it as a second input to said full adder.

28. The binary address generator of claim 27 wherein said selector means responds to a compare indication from one of said plurality of comparators for selecting a particular binary code to be supplied to said full adder.

29. A method for simultaneously stepping a plurality of scanning devices, comprising:

generating a separate sequence of multiple bit codes for each one of said plurality of scanning devices; and comparing the multiple bit code to be generated for a first scanning device with the multiple bit code being generated for a second scanning device.

30. The method of claim 29, further comprising: changing the sequence being generated for a particular scanning device in response to a compare indication resulting from said comparing step.

* * * * *